US012808292B2

(12) United States Patent
Sun et al.

(10) Patent No.: US 12,808,292 B2
(45) Date of Patent: Nov. 24, 2026

(54) CEMENT EVALUATION WITH COATED PIPE

(71) Applicant: Halliburton Energy Services, Inc., Houston, TX (US)

(72) Inventors: Qingtao Sun, Houston, TX (US); Amit Padhi, Houston, TX (US); Mark Collins, Houston, TX (US); Ramiro Andres Gonzalez Carrillo, Houston, TX (US); Yingyu Qi, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 332 days.

(21) Appl. No.: 18/616,834

(22) Filed: Mar. 26, 2024

(65) Prior Publication Data

US 2025/0305406 A1 Oct. 2, 2025

(51) Int. Cl.

*E21B 47/005* (2012.01)
*G01N 29/02* (2006.01)
*G01N 29/04* (2006.01)
*G01N 29/22* (2006.01)
*G01V 1/50* (2006.01)
*G01V 1/52* (2006.01)

(52) U.S. Cl.

CPC ......... *E21B 47/005* (2020.05); *G01N 29/041* (2013.01); *G01N 29/225* (2013.01); *G01V 1/50* (2013.01); *G01N 2291/0232* (2013.01); *G01N 2291/0251* (2013.01); *G01N 2291/2636* (2013.01); *G01V 2001/526* (2013.01)

(58) Field of Classification Search

CPC ...... E21B 47/005; G01N 29/041; G01V 1/44; G01V 1/46; G01V 1/48; G01V 1/50; G01V 1/52; G01V 1/523; G01V 2001/526

See application file for complete search history.

(56) References Cited

U.S. PATENT DOCUMENTS 9,348,052 B2 5/2016 Collins et al.
9,513,396 B2 12/2016 Collins et al.
9,529,105 B2 12/2016 Collins et al.
9,772,420 B2 9/2017 Collins
(Continued)

OTHER PUBLICATIONS

Van Kuijk, Robert, et al. "A novel ultrasonic cased-hole imager for enhanced cement evaluation." International petroleum technology conference. IPTC, 2005.*
(Continued)

*Primary Examiner* — Herbert K Roberts
(74) *Attorney, Agent, or Firm* — Michael Jenney; C. Tumey Law Group PLLC

(57) ABSTRACT

Disclosed herein are methods and systems of evaluating cement integrity behind a coated casing string using acoustic signals. The methods include disposing an acoustic logging tool inside a coated casing string, wherein the coated casing string is disposed in a wellbore to form an annulus between the coated casing string and the wellbore, and is at least in part bonded to the wellbore by a cement. Further, the methods include transmitting an acoustic signal into at least part of the coated casing string to form a Lamb wave mode, measuring an attribute of a Lamb wave mode, and determining if the coated casing string is fully or partially bonded to the cement or is free pipe or is partially bonded to a formation based at least in part on the Lamb wave mode.

20 Claims, 10 Drawing Sheets

(56) References Cited

U.S. PATENT DOCUMENTS

| | | | |
|---|---|---|---|
| 9,995,837 B2 | 6/2018 | Collins | |
| 10,267,941 B2 | 4/2019 | Collins et al. | |
| 10,281,606 B2 | 5/2019 | Erdemir et al. | |
| 10,294,403 B2 | 5/2019 | Hall et al. | |
| 10,359,530 B2 | 7/2019 | Collins | |
| 10,571,584 B2 | 2/2020 | Padhi | |
| 10,598,563 B2 | 3/2020 | Lu et al. | |
| 10,781,138 B2 | 9/2020 | Hall et al. | |
| 10,955,576 B2 | 3/2021 | Pattnaik et al. | |
| 10,989,824 B2 | 4/2021 | Hornby et al. | |
| 11,194,070 B2 | 12/2021 | Padhi et al. | |
| 11,237,288 B2 | 2/2022 | Hornby et al. | |
| 11,261,721 B2 | 3/2022 | Hornby et al. | |
| 11,269,096 B2 | 3/2022 | Padhi et al. | |
| 11,460,593 B2 | 10/2022 | Padhi et al. | |
| 11,506,806 B2 | 11/2022 | Padhi et al. | |
| 11,567,228 B2 | 1/2023 | Zhao et al. | |
| 11,650,346 B2 | 5/2023 | Chang et al. | |
| 11,662,495 B2 | 5/2023 | Chang et al. | |
| 11,662,496 B2 | 5/2023 | Cabella et al. | |
| 2006/0198243 A1* | 9/2006 | Tang | E21B 47/005 367/35 |
| 2014/0195160 A1 | 7/2014 | Collins et al. | |
| 2014/0222346 A1 | 8/2014 | Collins et al. | |
| 2015/0049585 A1 | 2/2015 | Collins et al. | |
| 2016/0209539 A1* | 7/2016 | Le Calvez | G01V 1/50 |
| 2016/0291189 A1 | 10/2016 | Collins | |
| 2017/0212260 A1 | 7/2017 | Padhi | |
| 2017/0329031 A1 | 11/2017 | Collins | |
| 2018/0067223 A1 | 3/2018 | Le Calvez et al. | |
| 2018/0149019 A1 | 5/2018 | Bose et al. | |
| 2018/0217021 A1 | 8/2018 | Lu et al. | |
| 2018/0329099 A1 | 11/2018 | Erdimer et al. | |
| 2019/0219718 A1 | 7/2019 | Collins et al. | |
| 2020/0241159 A1 | 7/2020 | Willis et al. | |
| 2021/0123731 A1 | 4/2021 | Chang et al. | |
| 2021/0208295 A1 | 7/2021 | Padhi et al. | |
| 2021/0277767 A1 | 9/2021 | Hornby et al. | |
| 2022/0010670 A1 | 1/2022 | Padhi et al. | |
| 2022/0025764 A1 | 1/2022 | Collins | |
| 2022/0268145 A1 | 8/2022 | Padhi et al. | |
| 2022/0365240 A1 | 11/2022 | Imrie et al. | |
| 2022/0381137 A1* | 12/2022 | Kamgang | E21B 47/085 |
| 2022/0413176 A1 | 12/2022 | Padhi et al. | |
| 2023/0175385 A1 | 6/2023 | Wang et al. | |
| 2023/0280489 A1 | 9/2023 | Chang et al. | |

OTHER PUBLICATIONS

International Search Report and Written Opinion for International Patent Application No. PCT/US2024/023403 dated Dec. 19, 2024. PDF file. 8 pages.

Lumankun et al., OnePetro, Improving Cement-to-Pipe Bonding Evaluation on Coated Casing. International Petroleum Technology Conference, Mar. 2021.

* cited by examiner

CEMENT EVALUATION WITH COATED PIPE

BACKGROUND

In the drilling of oil and gas wells, a wellbore is formed using a drill bit at the lower end of a drill string. The drill bit is rotated while force is applied through the drill string and against the rock face of the formation being drilled. After drilling to a predetermined depth, the drill string and bit are removed, and the wellbore is lined with a string of casing. An annular area is thus formed between the string of casing and the formation penetrated by the wellbore.

A cementing operation is typically conducted to displace drilling fluid and fill part or all of the hollow-cylindrical annular area between the casing and the borehole wall with cement. The combination of cement and casing strengthens the wellbore and facilitates the zonal fluid isolation of certain sections of a hydrocarbon-producing formation (or "pay zones") behind the casing. The first string of casing is placed from the surface and down to a first drilled depth. This casing is known as a surface casing. In the case of offshore operations, this casing may be referred to as a conductor pipe. Typically, one of the main functions of the initial string(s) of casing is to isolate and protect the shallower, usable water bearing aquifers from contamination by any other wellbore fluids. Accordingly, these casing strings are almost always cemented entirely back to surface. One or more intermediate strings of casing are also run into the wellbore. These casing strings will have progressively smaller outer diameters into the wellbore. In most current wellbore completion jobs, especially those involving so called unconventional formations where high-pressure hydraulic operations are conducted downhole, these casing strings may be entirely cemented. In some instances, an intermediate casing string may be a liner, that is, a string of casing that is not tied back to the surface.

The process of drilling and then cementing progressively smaller strings of casing is repeated several times until the well has reached total depth. In some instances, the final string of casing is also a liner. The final string of casing, referred to as a production casing, is also typically cemented into place. Additional tubular bodies may be included in a well completion. These include one or more strings of production tubing placed within the production casing or liner. Each tubing string extends from the surface to a designated depth proximate a production interval, or "pay zone." Each tubing string may be attached to a packer. The packer serves to seal off the annular space between the production tubing string(s) and the surrounding casing.

It is important that the cement sheath surrounding the casing strings have a high degree of circumferential and axial integrity around the casing annulus against fluid channeling or flowing through the cement along the wellbore. The cement must also bond with the casing surface and borehole wall to perform a hydraulic seal against fluid migration along the wellbore. This means that the cement is fully placed into the annular region to prevent fluid communication between fluids at the level of subsurface completion and aquifers residing just below the surface. Such fluids may include fracturing fluids, aqueous acid, and formation fluids.

The integrity of a cement sheath may be determined through the use of a cement bond log. A cement bond log uses an acoustic signal that is transmitted by a logging tool at the end of a wireline. The logging tool includes a transmitter, and then a receiver that "listens" for sound waves generated by the transmitter through the surrounding casing strings. The logging tool includes a signal processor that takes a continuous measurement of the amplitude of sound pulses from the transmitter to the receiver. The theory behind the cement bond log is that the amplitude of a sonic signal as it travels through a well cemented pipe is only a fraction of the amplitude through uncemented pipe. Acoustic signals in free steel casing generally provide a large amplitude because the acoustic energy remains in the steel. However, for casing that is surrounded by and well bonded with cement, the amplitude is small because the acoustic energy is dispersed not only in the steel but also into the coupled cement and formation. Bond logs may also measure acoustic impedance of the cement or other material in the annulus behind the casing by resonant frequency decay.

Low-frequency sonic measurements, such as the Cement-Bond-Log/Variable-Density-Log were introduced in the 1970's with modalities operating around 20 kHz that remain relevant until today due to the benefits, albeit limited, of providing a first-order cost-effective diagnosis. Ultrasonic pulse-echo measurements, operating with center frequencies between 200 and 500 kHz and coupling acoustic energy through a fluid path, were introduced in the 1980's and 1990's with the capability to provide an image of the acoustic impedance of the annular fill as a function of depth and azimuth as the device is pulled up the well along a helical path. The pulse-echo technique is a technique in which an ultrasonic transducer, in transmit mode, emits a high-frequency acoustic pulse towards the borehole wall, where it is reflected back to the same transducer operating in receiver mode. The measurement consists of the amplitude of the received signal, the time between emission and reception, and sometimes the full waveform received. Tools that use this technique either have multiple transducers, facing in different directions, or rotate the transducer while making measurements, thereby obtaining a full image of the borehole wall. The ultrasonic pulse-echo was augmented in the 2000's with a pitch-catch modality to enhance the imaging capabilities, and in particular to obtain signals that probe the entire cement sheath thickness. As these measurements gained in practice along with the advent of new developments in well construction and cementing materials, a number of limitations and desirable outcomes have been identified and have motivated further research to enhance the acoustic diagnosis.

Good cement bonds are crucial to ensure good zonal isolation across the reservoir intervals. However, casing external coating is another aspect affecting the cement to casing bonds. A coating may be deposited on the casing to reduce corrosion, friction, wear, erosion, and deposits. For instance, relatively thick and porous protective films may be formed on carbon steels and copper alloys while thin invisible passive films may be deposited on stainless steels, nickel alloy, and other passive metals like titanium. However, the addition of a coating on the casing may have a negative impact on the acoustic diagnosis due to the contrast between the casing material, the coating material, and the material inside the annulus or lack thereof. Further, the coating thickness on the casing is not homogeneous along the depth and azimuth of the well.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates to the field of well drilling and completions, and more specifically to the evaluation of cement integrity behind a coated casing string using acoustic signals. Ultrasonic waveform data can be gathered using various techniques, such as a pitch-catch technique performed using transducers in a pitch-catch arrangement. The ultrasonic waveform data collected by the pitch-catch arrangement includes leaky-Lamb wave measurements which can be decomposed in extensional mode and flexural mode components. The flexural mode or zero-order antisymmetric mode ($A_0$) and symmetric mode ($S_0$) are highly dispersive. Further, the flexural mode is sensitive to the interface between casing and coating, between coating and cement, and between cement and formation. Herein are described methods and systems to evaluate cement integrity behind coated casing strings using the attribute of the symmetric mode ($S_0$) and antisymmetric mode ($A_0$) from a pitch-catch configuration with optimized transducer angle and firing frequency to excite the symmetric mode ($S_0$) and antisymmetric mode ($A_0$) in the casing. The attribute of the symmetric mode ($S_0$) and antisymmetric mode ($A_0$) can be defined as the integral of the ($A_0$+$S_0$) waveform amplitude measurement as a proxy for energy of the modes. Correlation between the attribute and the impedance of the material in the annulus can be reliable under different coating thickness, such as from 0.01 mm to 2 mm, for example. Further, the measurement is sensitive enough to distinguish the different potential material in the annulus such as mud from light cement for example, which is a known challenge with conventional ultrasonic measurements.

As disclosed herein, acoustic logging tools may be used to emit an acoustic signal which may traverse through at least part of a conduit string to at least part of a casing to the coating of the casing to at least part of the cement to at least part of the cement-formation section. Reflected signals are measured by the acoustic logging tool. Reflected signals may be analyzed to determine if the section of casing is fully bonded to the cement, or is free pipe, or is partially bonded to the cement, for example. Further, the analysis of the reflected signals can determine if the cement is bonded to the formation or partially bonded to the formation.

Figure 1:
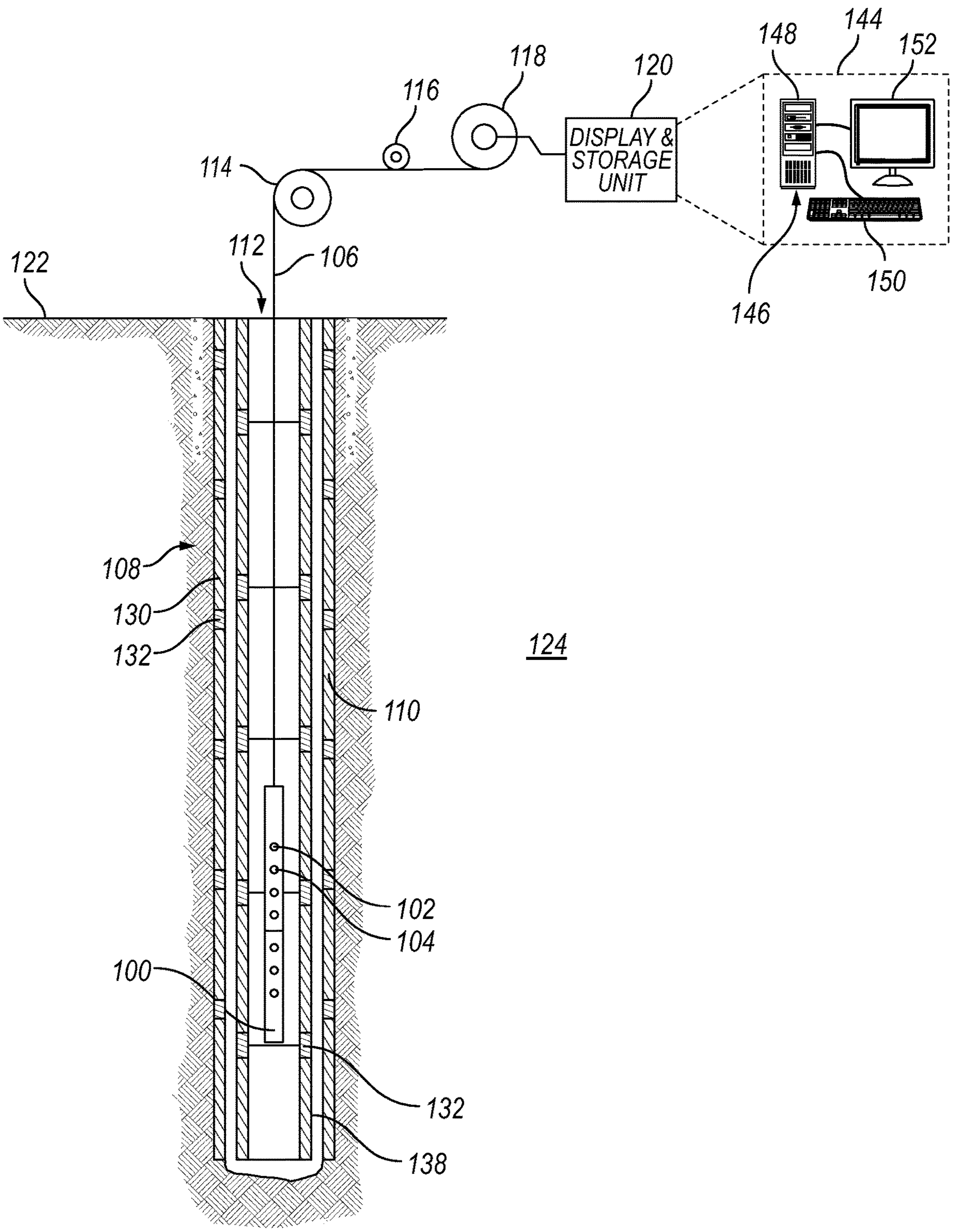
FIG. 1 illustrates an example of an operating environment for an acoustic logging tool according to an embodiment of the present disclosure.

FIG. 1 illustrates an operating environment for an acoustic logging tool 100 as disclosed herein. Acoustic logging tool 100 may comprise a transmitter 102 and a receiver 104. Additionally, transmitter 102 and receiver 104 may be configured to rotate in acoustic logging tool 100. In examples, there may be any number of transmitters 102 and/or any number of receivers 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within conduit string 108 to a desired depth within the wellbore 110. In examples, tubing may be concentric in the casing, however in other examples the tubing may not be concentric. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical conduit string 108 may extend from wellhead 112 at or above ground level to a selected depth within a wellbore 110. Conduit string 108 may comprise a plurality of joints 130 or segments of conduit string 108, each joint 130 being connected to the adjacent segments by a collar 132. Additionally, conduit string 108 may include a plurality of tubing.

FIG. 1 also illustrates inner conduit string 138, which may be positioned inside of conduit string 108 extending part of the distance down wellbore 110. Inner conduit string 138 may be production tubing, tubing string, conduit string, or other pipe disposed within conduit string 108. Inner conduit string 138 may comprise concentric pipes. It should be noted that concentric pipes may be connected by collars 132. Acoustic logging tool 100 may be dimensioned so that it may be lowered into the wellbore 110 through inner conduit string 108, thus avoiding the difficulty and expense associated with pulling inner conduit string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to surface 122 during logging.

Acoustic logging tool 100 may be used for excitation of transmitter 102. As illustrated, one or more receivers 104 may be positioned on the acoustic logging tool 100 at selected distances (e.g., axial spacing) away from transmitter 102. The axial spacing of receiver 104 from transmitter 102 may vary, for example, from about 0 inch (0 cm) to about 40 inches (101.6 cm) or more. In some embodiments, at least one receiver 104 may be placed near the transmitter 102 (e.g., within at least 1 inch (2.5 cm) while one or more additional receivers may be spaced from 1 foot (30.5 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. Transmitter 102 may include any suitable acoustic source for generating acoustic waves downhole, including, but not limited to, monopole and multipole sources (e.g., dipole, cross-dipole, quadrupole, hexapole, or higher order multi-pole transmitters). Additionally, one or more transmitters 102 (which may include segmented transmitters) may be combined to excite a mode corresponding to an irregular/arbitrary mode shape. Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that may convert acoustic waves into an electric signal.

Transmission of acoustic waves by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). Non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, ect.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

Figure 2:
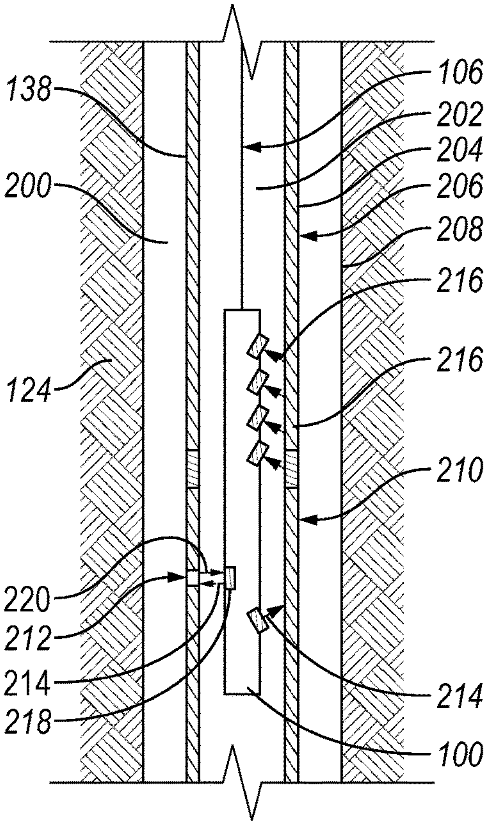
FIG. 2 illustrates another example of acoustic logging tool during logging operations according to another embodiment of the present disclosure.

FIG. 2 illustrates acoustic logging tool 100 during logging operations. As illustrated, logging operations (for the methods and systems discussed below) may utilize sonic or ultrasonic pulse-echo and pitch catch flexural waves generated from one or more transmitters 102 (referring to FIG. 1) and recorded by a plurality of at least one receiver 104 to predict a material state of material 200 behind pipe string 138. Material 200 may be cement, for example. During operations, logging tool 100 is suspended in mud 202 by conveyance 106. As noted above, to form an acoustic log, sonic or ultrasonic pulse-echo and pitch catch flexural waves are generated and recorded. Both waves, which are produced by different systems and methods on acoustic logging tool 100, may be used to analyze material 200 behind pipe string 138. As illustrated, there may be at least three interfaces in which acoustic waves may reflect and/or refract. Those interfaces are a first interface 204, a second interface 206, and third interface 208. First interface 204 is defined as a location in which mud 202 contacts the inner surface of pipe string 138. At a first interface a large reflection may occur, however acoustic waves which refract through a first interface may approach a second interface 206. Second interface 206 is defined as a location in which the outer surface of pipe string 138 contacts with a material 200. The acoustic waves which refract through second interface may be implemented to evaluate material 200. Third interface 208 is defined as a location in which material 200 contacts formation 124.

For pitch-catch methods 210, transmitters 102 and at least one receiver 104 may be tilted at or about 35 degrees with respect to a normal to the longitudinal axis of acoustic tool 100. The choice of angle depends on the mud 202 inside the pipe string. This may allow for generation of sonic or ultrasonic waves 214 from transmitter 102 to travel along any of the above identified interfaces and be recorded by at least one receiver 104 as one or more flexural waves $A_o$ 216. Flexural waves $A_o$ 216 may be sonic or ultrasonic waves 214. In a pulse-echo method 212, sonic or ultrasonic waves 214 may be transmitted and received as $S_1$ mode wave 220 by transducer 218. In such method, sonic or ultrasonic waves 214 may be transmitted from transducer 218 about perpendicular to pipe casing 138. Sonic or ultrasonic waves 214 may reflect and/or refract off any of the above identified interfaces and is recorded as one or more $S_1$ mode wave 220 by transducer 218. Recorded $S_1$ mode wave 220 may be processed similarly to flexural waves $A_o$ 216. Processed $S_1$ mode wave 220 may be recorded as acoustic impedance in units of Rayls. The acoustic log may further be processed to process the recorded flexural waves $A_0$ 216 and S1 mode wave 220 to determine the material 200 behind pipe string 138.

Figure 3:
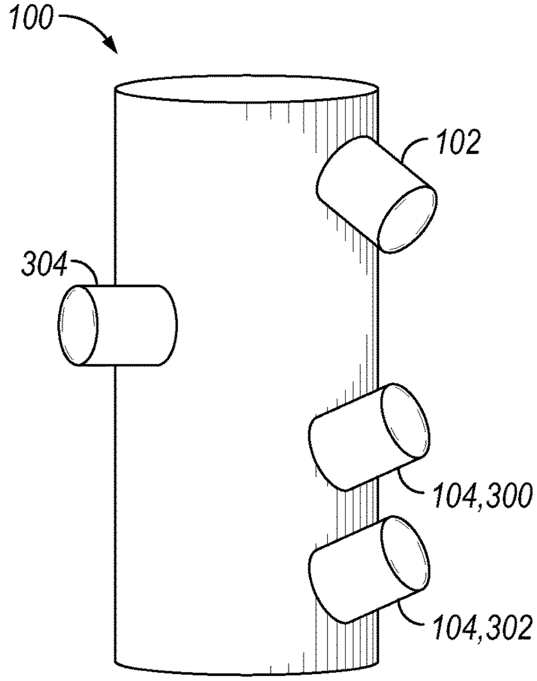
FIG. 3 is a perspective view of another example of acoustic logging tool according to another embodiment of the present disclosure.

FIG. 3 is a perspective view of acoustic logging tool 100. As illustrated, transmitters 102 and at least one receiver 104 are inverted, as compared to the embodiments in FIGS. 1 and 2. However, acoustic logging tool 100 and the methods described may still operate and function the same way as described above and below. As illustrated, acoustic logging tool 100 may comprise a transmitter 102 and at least one receiver 104, which may be arranged in a pitch and catch configuration. That is, transmitter 102 may be a pitch transducer, and at least one receiver 104 may be near and far catch transducers spaced at suitable near and far axial distances from transmitter 102, respectively. In such a configuration, transmitter 102 (i.e., may also be referred to as a source pitch transducer) emits sonic or ultrasonic waves while at least one receiver 104 (i.e., may also be referred to as catch transducers) receive the sonic or ultrasonic waves after reflection and/or refraction from the wellbore fluid, casing, coating, cement, and formation and record the received waves as time-domain waveforms. At least one receiver 104 may further be identified as near receiver 300 and far receiver 302. Near receiver 300 being at least one receiver 104 closest to transmitter 102 and far receiver 302 being at least one receiver 104 the furthest away from transmitter 102. Because the distance between near receiver 300 and far receiver 302 is known, differences between the reflected and/or refracted waveforms received by at least one receiver 104 provide information about attenuation that may be correlated to material 200 (e.g., referring to FIG. 2) in the annular wellbore region, and they allow a depth of investigation in the radial direction around wellbore 110 (e.g., referring to FIG. 1).

The pitch-catch transducer pairing may have different frequency, spacing, and/or angular orientations based on environmental effects and/or tool design. For example, if transmitter 102 and at least one receiver 104 operate in the sonic range, spacing ranging from three to fifteen feet may be appropriate, with three and five feet spacing being also suitable. If transmitter 102 and at least one receiver 104 operate in the sonic or ultrasonic range, the spacing may be less. Acoustic logging tool 100 may comprise, in addition or as an alternative to at least one receiver 104, a pulsed echo sonic or ultrasonic transducer 304. Pulsed echo sonic or ultrasonic transducer 304 may, for instance, operate at a frequency from 80 kHz up to 800 kHz. The optimal transducer frequency is a function of the casing size, weight, mud environment, and other conditions. Pulsed echo sonic or ultrasonic transducer 304 transmits waves, receives the same waves after they reflect off of the casing, annular space and formation, and records the waves as time-domain waveforms. As noted above, reflected/refracted S1 mode wave 220 and flexural waves $A_o$ 216 (e.g., referring to FIG. 2) that are recorded may be further processed into an acoustic log to determine material 200 (e.g., referring to FIG. 2) behind pipe string 138 (e.g., referring to FIG. 1).

Figure 4:
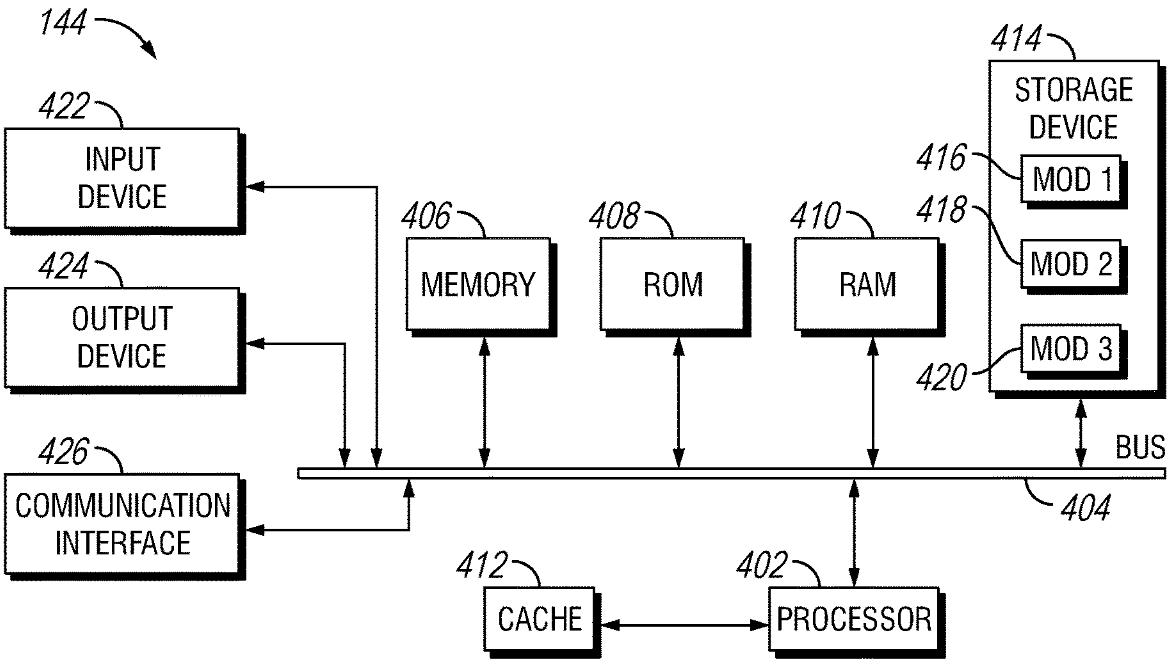
FIG. 4 illustrates an example of an information handling system according to an embodiment of the present disclosure.

FIG. 4 illustrates an example information handling system 144 (referring to FIG. 1) which may be employed to perform various steps, methods, and techniques disclosed herein. As illustrated, information handling system 144 includes a processing unit (CPU or processor) 402 and a system bus 404 that couples various system components including system memory 406 such as read only memory (ROM) 408 and random-access memory (RAM) 410 to processor 402. Processors disclosed herein may all be forms of this processor 402. Information handling system 144 may include a cache 412 of high-speed memory connected directly with, in close proximity to, or integrated as part of processor 402. Information handling system 144 copies data from memory 406 and/or storage device 414 to cache 412 for quick access by processor 402. In this way, cache 412 provides a performance boost that avoids processor 402 delays while waiting for data. These and other modules may control or be configured to control processor 402 to perform various operations or actions. Other system memory 406 may be available for use as well. Memory 406 may include multiple different types of memory with different performance characteristics. It may be appreciated that the disclosure may operate on information handling system 144 with more than one processor 402 or on a group or cluster of computing devices networked together to provide greater processing capability. Processor 402 may include any general purpose processor and a hardware module or software module, such as first module 416, second module 418, and third module 420 stored in storage device 414, configured to control processor 402 as well as a special-purpose processor where software instructions are incorporated into processor 402. Processor 402 may be a self-contained computing system, containing multiple cores or processors, a bus, memory controller, cache, etc. A multi-core processor may be symmetric or asymmetric. Processor 402 may include multiple processors, such as a system having multiple, physically separate processors in different sockets, or a system having multiple processor cores on a single physical chip. Similarly, processor 402 may include multiple distributed processors located in multiple separate computing devices but working together such as via a communications network. Multiple processors or processor cores may share resources such as memory 406 or cache 412 or may operate using independent resources. Processor 402 may include one or more state machines, an application specific integrated circuit (ASIC), or a programmable gate array (PGA) including a field PGA (FPGA).

The information handling system 144 may comprise a processor 402 that executes one or more instructions for processing the one or more measurements. The information handling system 144 may comprise processor 402 that executes one or more instructions for processing the one or more measurements. Information handling system 144 may process one or more measurements according to any one or more algorithms, functions, or calculations discussed below. In one or more embodiments, the information handling system 144 may output a return signal.

Processor 402 may include, for example a microprocessor, microcontroller, digital signal processor (DSP), application specific integrated circuit (ASIC), or any other digital or analog circuitry configured to interpret, execute program instructions, process data, or any combination thereof. Processor 402 may be configured to interpret and execute program instructions or other data retrieved and stored in any memory such as memory 406 or cache 412. Program instructions or other data may constitute portions of a software or application for carrying out one or more methods described herein, memory 406 or cache 412 may comprise read-only memory (ROM), random access memory (RAM), solid state memory, or disk-based memory. Each memory module may include any system, device or apparatus configured to retain program instructions, program data, or both for a period of time (e.g., computer-readable non-transitory media). For example, instructions from a software or application may be retrieved and stored in memory 406 for execution by processor 402.

Each individual component discussed above may be coupled to system bus 404, which may connect each and every individual component to each other. System bus 404 may be any of several types of bus structures including a memory bus or memory controller, a peripheral bus, and a local bus using any of a variety of bus architectures. A basic input/output (BIOS) stored in ROM 408 or the like, may provide the basic routine that helps to transfer information between elements within information handling system 144, such as during start-up. Information handling system 144 further includes storage devices 414 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 414 may include software modules 416, 418, and 420 for controlling processor 402. Information handling system 144 may include other hardware or software modules. Storage device 414 is connected to the system bus 404 by a drive interface. The drives and the associated computer-readable storage devices provide nonvolatile storage of computer-readable instructions, data structures, program modules and other data for information handling system 144. In one aspect, a hardware module that performs a particular function includes the software component stored in a tangible computer-readable storage device in connection with the necessary hardware components, such as processor 402, system bus 404, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 144 is a small, handheld computing device, a desktop computer, or a computer server. When processor 402 executes instructions to perform "operations", processor 402 may perform the operations directly and/or facilitate, direct, or cooperate with another device or component to perform the operations.

As illustrated, information handling system 144 employs storage device 414, which may be a hard disk or other types of computer-readable storage devices which may store data that are accessible by a computer, such as magnetic cassettes, flash memory cards, digital versatile disks (DVDs), cartridges, random access memories (RAMs) 410, read only memory (ROM) 408, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 144, an input device 422 represents any number of input mechanisms, such as a microphone for speech, a touch-sensitive screen for gesture or graphical input, keyboard, mouse, motion input, speech and so forth. Additionally, input device 422 may take in data from one or more sensors. An output device 424 may also be one or more of a number of output mechanisms known to those of skill in the art. In some instances, multimodal systems enable a user to provide multiple types of input to communicate with information handling system 144. Communications interface 426 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 402, that is purpose-built to operate as an equivalent to software executing on a general-purpose processor. For example, the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 408 for storing software performing the operations described below, and random-access memory (RAM) 410 for storing results. Very large-scale integration (VLSI) hardware embodiments, as well as custom VLSI circuitry in combination with a general-purpose DSP circuit, may also be provided.

The logical operations of the various methods, described below, are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. Information handling system 144 may practice all or part of the recited methods, may be a part of the recited systems, and/or may operate according to instructions in the recited tangible computer-readable storage devices. Such logical operations may be implemented as modules configured to control processor 402 to perform particular functions according to the programming of software modules 416, 418, and 420.

In examples, one or more parts of the example information handling system 144, up to and including the entire information handling system 144, may be virtualized. For example, a virtual processor may be a software object that executes according to a particular instruction set, even when a physical processor of the same type as the virtual processor is unavailable. A virtualization layer or a virtual "host" may enable virtualized components of one or more different computing devices or device types by translating virtualized operations to actual operations. Ultimately however, virtualized hardware of every type is implemented or executed by some underlying physical hardware. Thus, a virtualization computer layer may operate on top of a physical computer layer. The virtualization computer layer may include one or more virtual machines, an overlay network, a hypervisor, virtual switching, and any other virtualization application.

Figure 5:
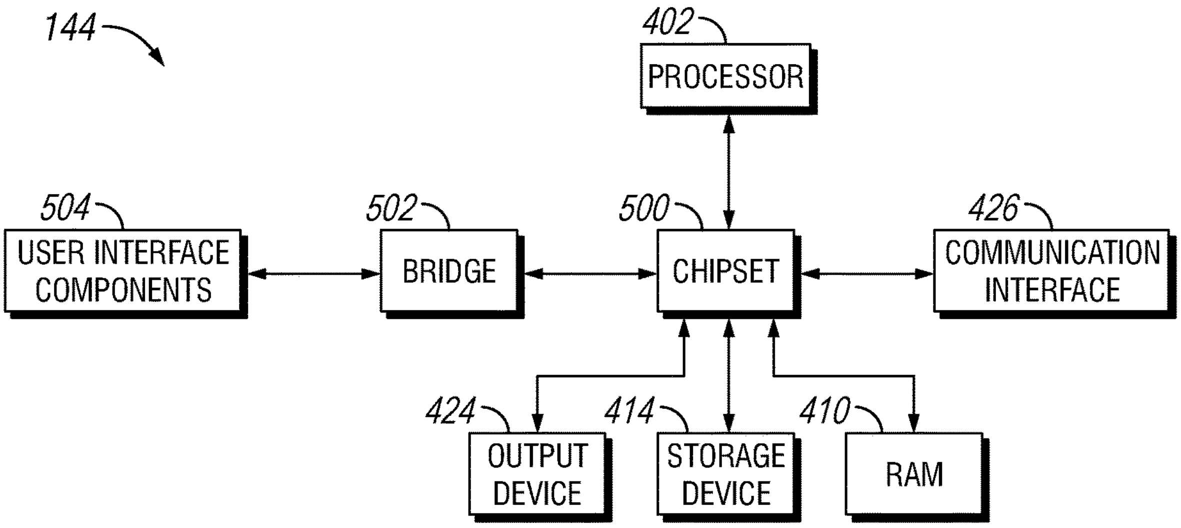
FIG. 5 illustrates another example information handling system having a chipset architecture that may be used in executing the described method and generating and displaying a graphical user interface.

FIG. 5 illustrates another example information handling system 144 having a chipset architecture that may be used in executing the described method and generating and displaying a graphical user interface (GUI). Information handling system 144 is an example of computer hardware, software, and firmware that may be used to implement the disclosed technology. Information handling system 144 may include a processor 402, representative of any number of physically and/or logically distinct resources capable of executing software, firmware, and hardware configured to perform identified computations. Processor 402 may communicate with a chipset 500 that may control input to and output from processor 402. In this example, chipset 500 outputs information to output device 424, such as a display, and may read and write information to storage device 414, which may include, for example, magnetic media, and solid-state media.

Chipset 500 may also read data from and write data to RAM 410. A bridge 502 for interfacing with a variety of user interface components 504 may be provided for interfacing with chipset 500. Such user interface components 504 may include a keyboard, a microphone, touch detection and processing circuitry, a pointing device, such as a mouse, and so on. In general, inputs to information handling system 144 may come from any of a variety of sources, machine generated and/or human generated.

Chipset 500 may also interface with one or more communication interfaces 426 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 402 analyzing data stored in storage device 414 or RAM 410. Further, information handling system 144 receives inputs from a user via user interface components 504 and executes appropriate functions, such as browsing functions by interpreting these inputs using processor 402.

In examples, information handling system 144 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

During the logging operations of FIG. 1, information handling system 144 may process different types of real time data and post-process data originated from varied sampling rates and various sources, such as diagnostics data, sensor measurements, operations data, and or the like as collected by acoustic logging tool 100. (e.g., referring to FIG. 1). These measurements from the acoustic logging tool 100 may allow for information handling system 144 to perform real-time assessments of the acoustic logging operation.

Figure 6:
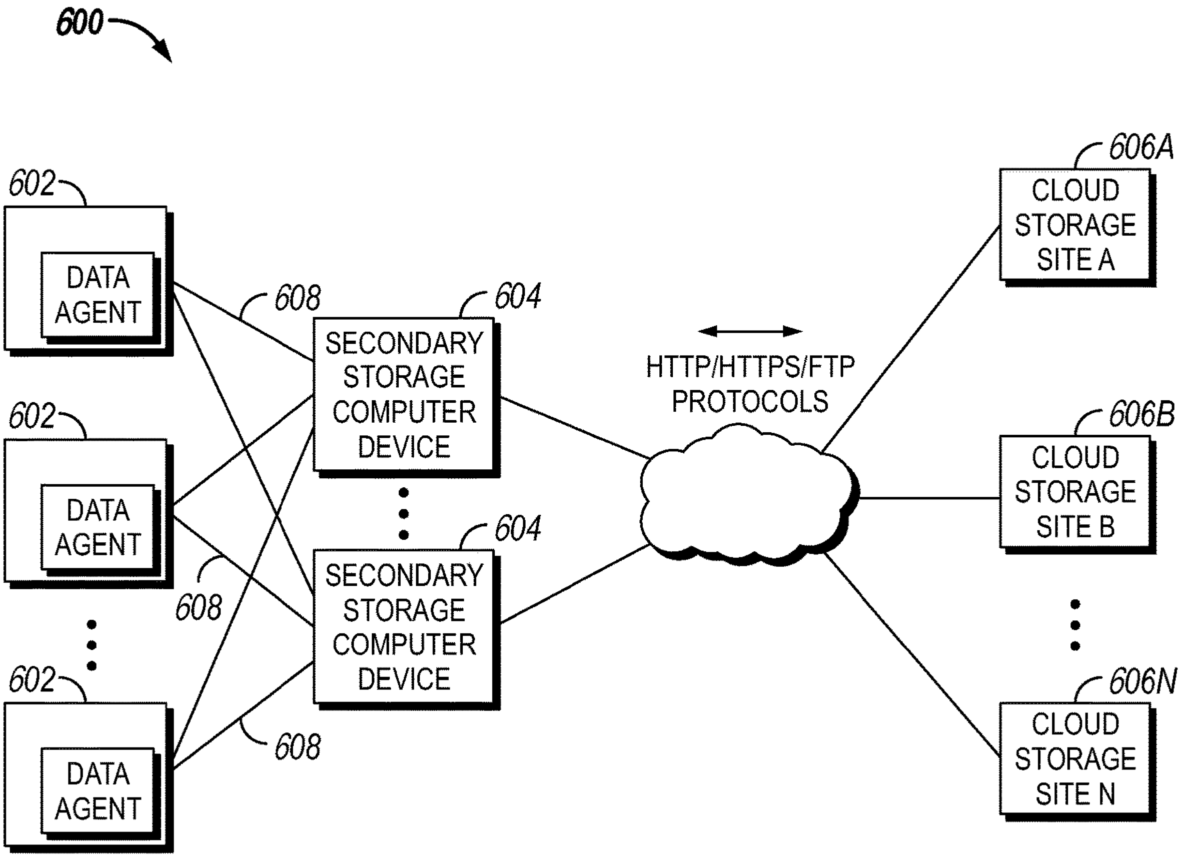
FIG. 6 illustrates an example of an arrangement of resources in a computing network according to an embodiment of the present disclosure.

FIG. 6 illustrates an example of one arrangement of resources in a computing network 600 that may employ the processes and techniques described herein, although many others are of course possible. As noted above, an information handling system 144, as part of their function, may utilize data, which comprises files, directories, metadata (e.g., access control list (ACLS) creation/edit dates associated with the data, etc.), and other data objects. The data on the information handling system 144 is typically a primary copy (e.g., a production copy). During a copy, backup, archive or other storage operation, information handling system 144 may send a copy of some data objects (or some components thereof) to a secondary storage computing device 604 by utilizing one or more data agents 602.

A data agent 602 may be a desktop application, website application, or any software-based application that is run on information handling system 144. As illustrated, information handling system 144 may be disposed at any well site (e.g., referring to FIG. 1) or at an offsite location. The data agent may communicate with a secondary storage computing device 604 using communication protocol 608 in a wired or wireless system. The communication protocol 608 may function and operate as an input to a website application. In the website application, field data related to pre- and postoperations, notes, and the like may be uploaded. Additionally, information handling system 144 may utilize communication protocol 608 to access processed measurements, troubleshooting findings, historical run data, and/or the like. This information is accessed from secondary storage computing device 604 by data agent 602, which is loaded on information handling system 144.

Secondary storage computing device 604 may operate and function to create secondary copies of primary data objects (or some components thereof) in various cloud storage sites 606A, 606B . . . 606N. Additionally, secondary storage computing device 604 may run determinative algorithms on data uploaded from one or more information handling systems 144, discussed further below. Communications between the secondary storage computing devices 604 and cloud storage sites 606A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 606A-N, the secondary storage computing device 604 may also perform local content indexing and/or local object-level, sub-object-level or block-level deduplication when performing storage operations involving various cloud storage sites 606A-N. Cloud storage sites 606A-N may further record and maintain logs for each downhole operation or run, store repair and maintenance data, store operational data, and/or provide outputs from determinative algorithms that are located in cloud storage sites 606A-N. In a non-limiting example, this type of network may be utilized as a platform to store, backup, analyze, import, preform extract, transform and load ("ETL") processes, mathematically process, apply machine learning algorithms, and interpret the data acquired by one or more acoustic logs.

Figure 7:
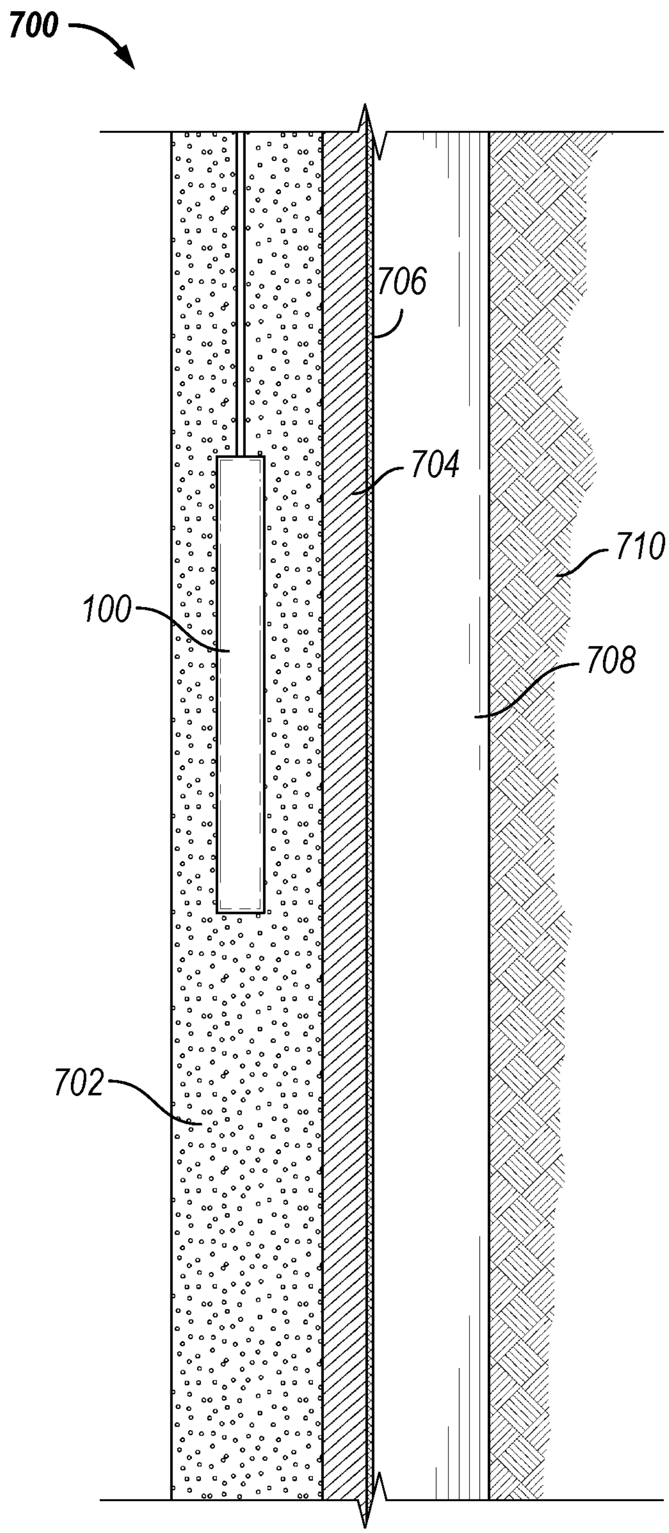
FIG. 7 is an example of a logging configuration for cement evaluation with coated pipe according to an embodiment of the present disclosure.

FIG. 7 is example 700 of a logging configuration for cement evaluation with a coated pipe according to embodiments of the present disclosure. Acoustic logging tool 100 (e.g., referring to FIG. 1) is immersed in logging fluid 702 inside casing 704. In some embodiments, logging fluid 702 may be reservoir drilling fluid mud. In other embodiments, logging fluid 702 may be water, such as brine, seawater, or tap water, for example. Casing 704 is coated with coating 706. Coating 706 may be any coating capable of protecting casing 704 from corrosion, friction, wear, erosion, and/or deposits such as epoxy coating, Flint coating, for example. Coating 706 may be an epoxy coating or a Flint coating in the numerical modeling in the examples below. Coating 706 may have different thicknesses depending upon the depth or azimuth and depending upon the corrosion, the friction, the wear, the erosion, and/or the deposits coating 706 is exposed to. Coating 706 is exposed to annulus 708. Annulus 708 may contain any material such as reservoir drilling mud, water, and/or cement, for example. Finally, the material in annulus 708 is exposed to geological formation 710.

Figure 8A:
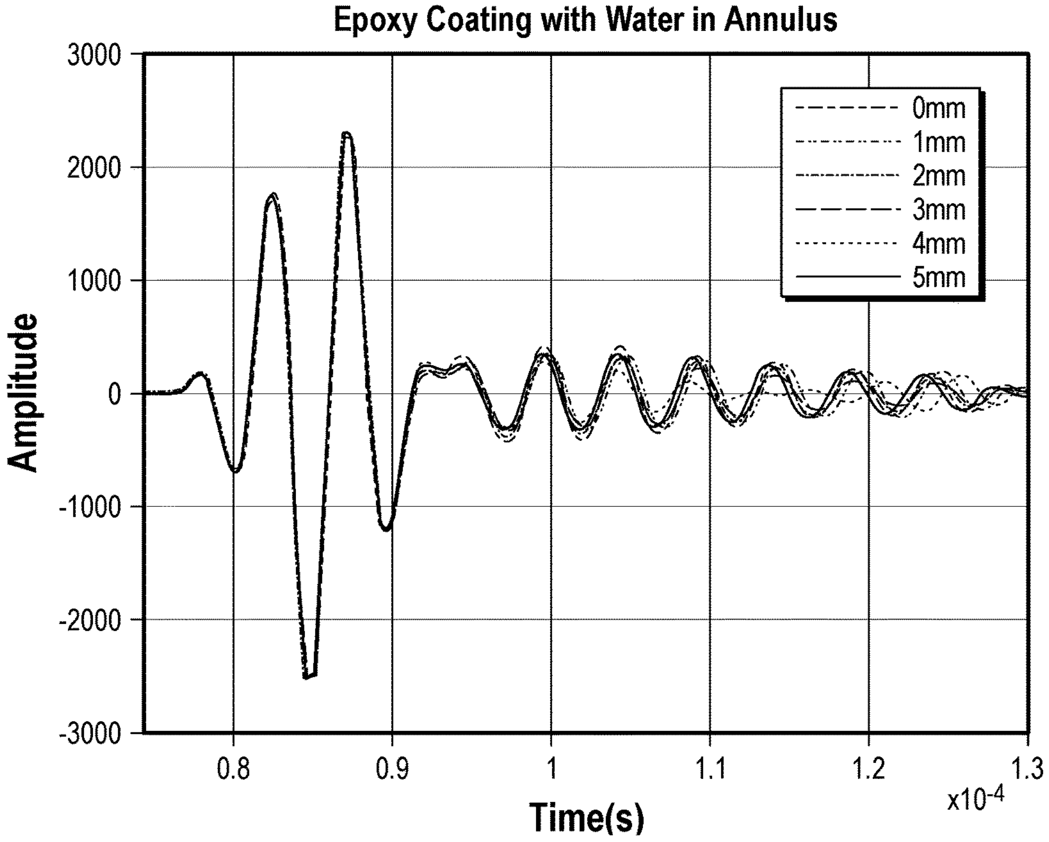
FIG. 8A is an example of synthetic waveforms with an epoxy coating of different thicknesses for different materials in the annulus for an ultrasonic pulse-echo measurement with the first high-order symmetric ($S_1$) quasi-Lamb mode.
Figure 8B:
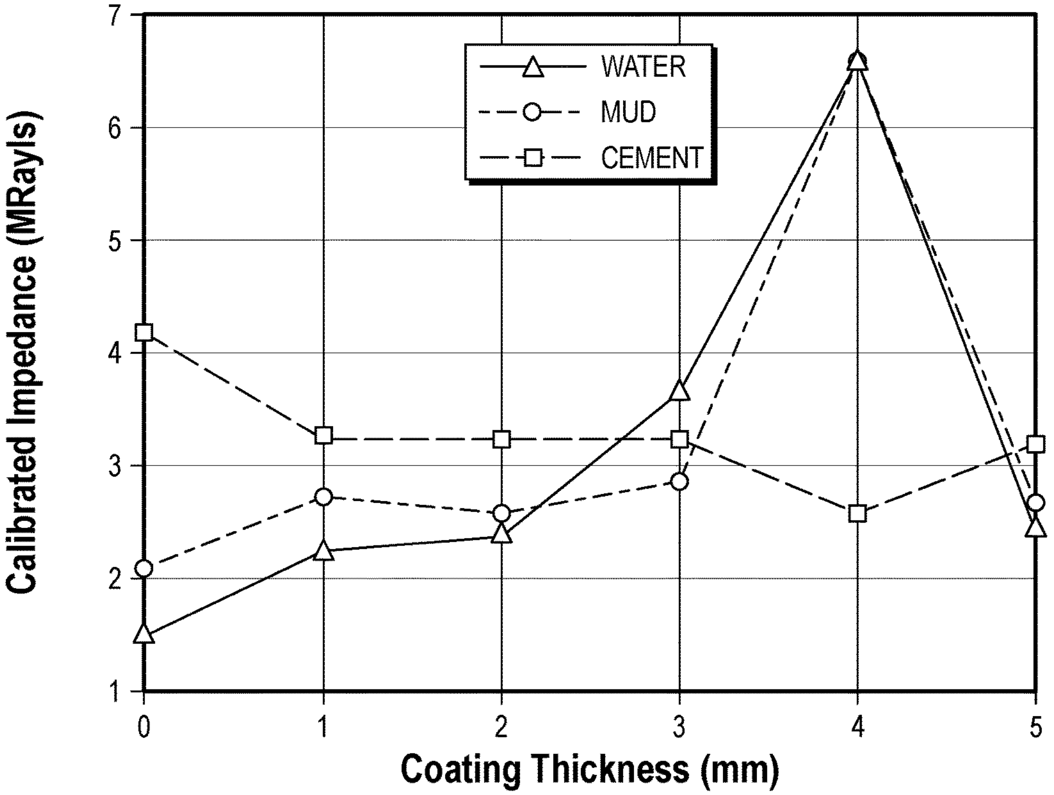
FIG. 8B is an example of the calibrated impedance as a function of epoxy coating thickness for different materials in the annulus for an ultrasonic pulse-echo measurement with the first high-order symmetric ($S_1$) quasi-Lamb mode.

FIG. 8A-B are examples of synthetic waveforms with an epoxy coating of different thicknesses (FIG. 8A) and the corresponding impedance (FIG. 8B) with different material in the annulus for an ultrasonic pulse-echo measurement. Ultrasonic pulse-echo measurement is commonly used for cement evaluation providing an effective acoustic impedance of the annular material adjacent to the casing with high azimuthal and axial resolution. It is based on the excitation, by an acoustic beam incident on the inner wall of the casing, of a thickness resonance of the casing mainly associated with the first high-order symmetric ($S_1$) quasi-Lamb mode. An inversion scheme is used to leverage the decay of the resonance mode and relate it to the acoustic impedance of the material in the annulus such as cement, mud, and/or water.

FIG. 8A represents the pulse-echo measurements after excitation of the $S_1$ mode in the casing with a single transducer normal to the casing surface working as both transmitter and receiver for an epoxy coating 706 (referring to FIG. 7) thickness from 0 mm to 1 mm, to 2 mm, to 3 mm, to 4 mm, to 5 mm, with water in annulus 708. In the numerical modeling of FIG. 8A, the epoxy coating 706 has an acoustic impedance of 3.05 MRayls. Water in annulus 708 has an acoustic impedance of 1.5 MRayls, mud in annulus 708 has an acoustic impedance of 2.07 MRayls, and cement in annulus 708 has an acoustic impedance of 4.07 MRays.

As illustrated in FIG. 8B, epoxy coating 706 has a significant impact on the annulus impedance estimates even with a thickness of epoxy coating of 1 mm as the impedance of water, mud, and cement converge to the value of impedance of epoxy itself. Therefore, the interpretation of the annulus impedance can be erroneous without knowing the precise thickness of the coating downhole. As the coating thickness increases further, the annular impedance estimates to characterize the material in the annulus becomes substantially inaccurate. For instance, the annulus impedance of cement is around 4 MRayls without any coating, around 2 MRayls for mud, and around 1.5 MRayls for water without any coating. However, the annulus impedance of water is around 3.8 MRayls, the annulus impedance of cement is around 3.1 MRayls, and the annulus impedance of mud is around 2.9 MRayls with an epoxy coating 706 thickness of 3 mm. It should be noted that the thickness of the coating is not known once the casing is in place downhole, and the ultrasonic measurement is performed. Therefore, the interpretation of the material in the annulus cannot be reliable using first high-order symmetric ($S_1$) quasi-Lamb mode with an epoxy coating without knowing its thickness.

Figure 9A:
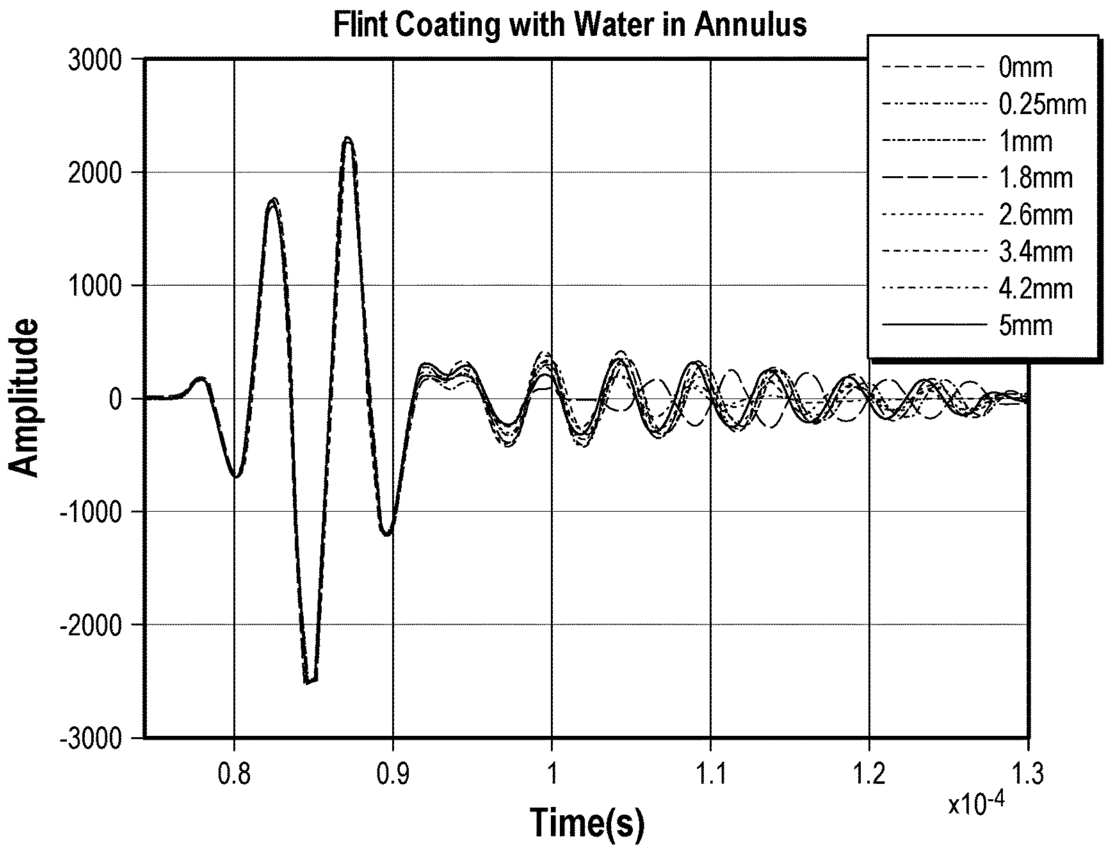
FIG. 9A is an example of synthetic waveforms with a Flint coating of different thicknesses for an ultrasonic pulse-echo measurement with the first high-order symmetric ($S_1$) quasi-Lamb mode.

FIG. 9A is an example of synthetic waveforms of the amplitudes as a function of time with a Flint coating of different thicknesses for an ultrasonic pulse-echo measurement with the first high-order symmetric ($S_1$) quasi-Lamb mode. FIG. 9A represents the pulse-echo measurements after excitation of the $S_1$ mode in the casing with a single transducer normal to the casing surface working as both transmitter and receiver for a Flint coating 706 (referring to FIG. 7) thickness from 0 mm to 1 mm, to 2 mm, to 3 mm, to 4 mm, to 5 mm, with water in annulus 708. In the numerical modeling of FIG. 9A, the Flint coating 706 has an acoustic impedance of 4.66 MRayls. Water in annulus 708 has an acoustic impedance of 1.5 MRayls, mud in annulus 708 has an acoustic impedance of 2.07 MRayls, and cement in annulus 708 has an acoustic impedance of 4.07 MRays.

Figure 9B:
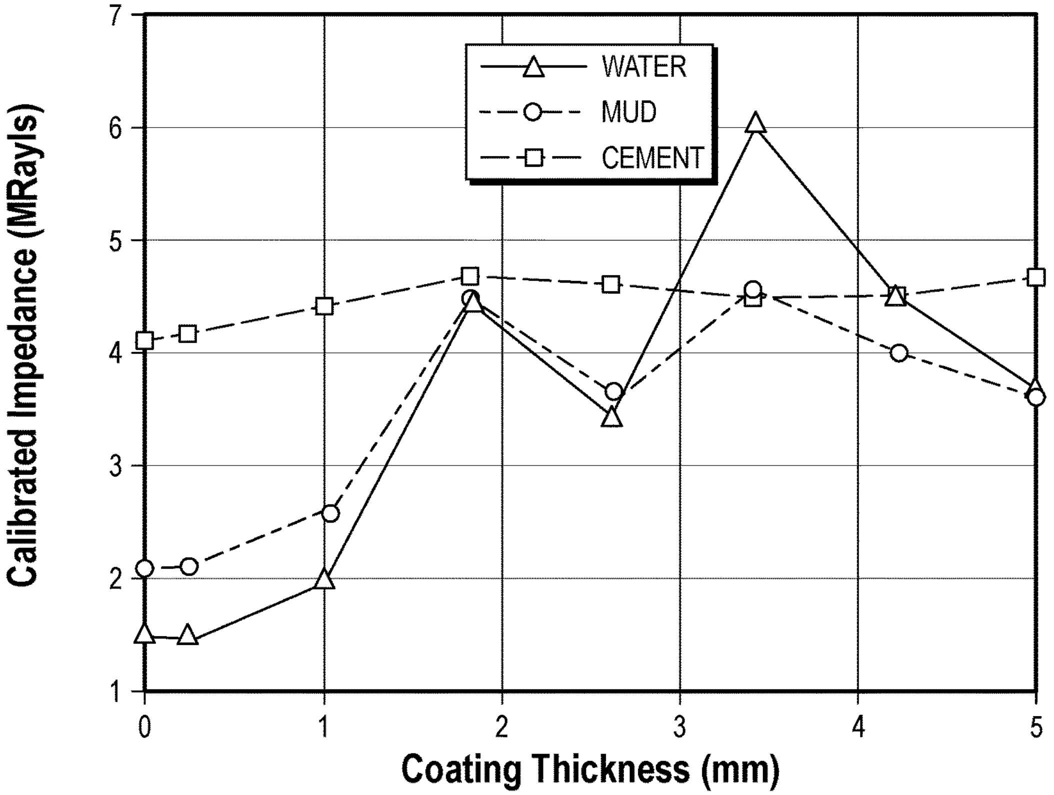
FIG. 9B is an example of synthetic waveforms with a Flint coating of different thicknesses and the corresponding impedance with different material in the annulus for an ultrasonic pulse-echo measurement with the first high-order symmetric ($S_1$) quasi-Lamb mode.

FIG. 9B is an example of synthetic waveforms with a Flint coating of different thicknesses and the corresponding impedance with different material in the annulus for an ultrasonic pulse-echo measurement with the first high-order symmetric ($S_1$) quasi-Lamb mode. As illustrated in FIG. 9B, Flint coating 706 has a significant impact on the annulus impedance even with a thickness of 1.5 mm. Indeed, the error in the estimated impedances of water and mud are past the generally acceptable 0.5 MRayl. Therefore, the interpretation of the annulus impedance to determine the material in the annulus can be erroneous without knowing the precise thickness of the coating downhole. For instance, the annulus impedance of cement is around 4 MRayls, around 2 MRayls for mud, and around 1.5 MRayls for water without any coating. However, the annulus impedance of water is around 4.8 MRayls, the annulus impedance of cement is around 4.7 MRayls, and the annulus impedance of mud is around 4.05 MRayls with a Flint coating 706 thickness of 3 mm. It should be noted that the thickness of the coating is not precisely known once the casing is in place downhole, and the ultrasonic measurement is performed. Therefore, the interpretation of the material in the annulus cannot be reliable using first high-order symmetric ($S_1$) quasi-Lamb mode with a Flint coating without knowing its thickness.

Figure 10:
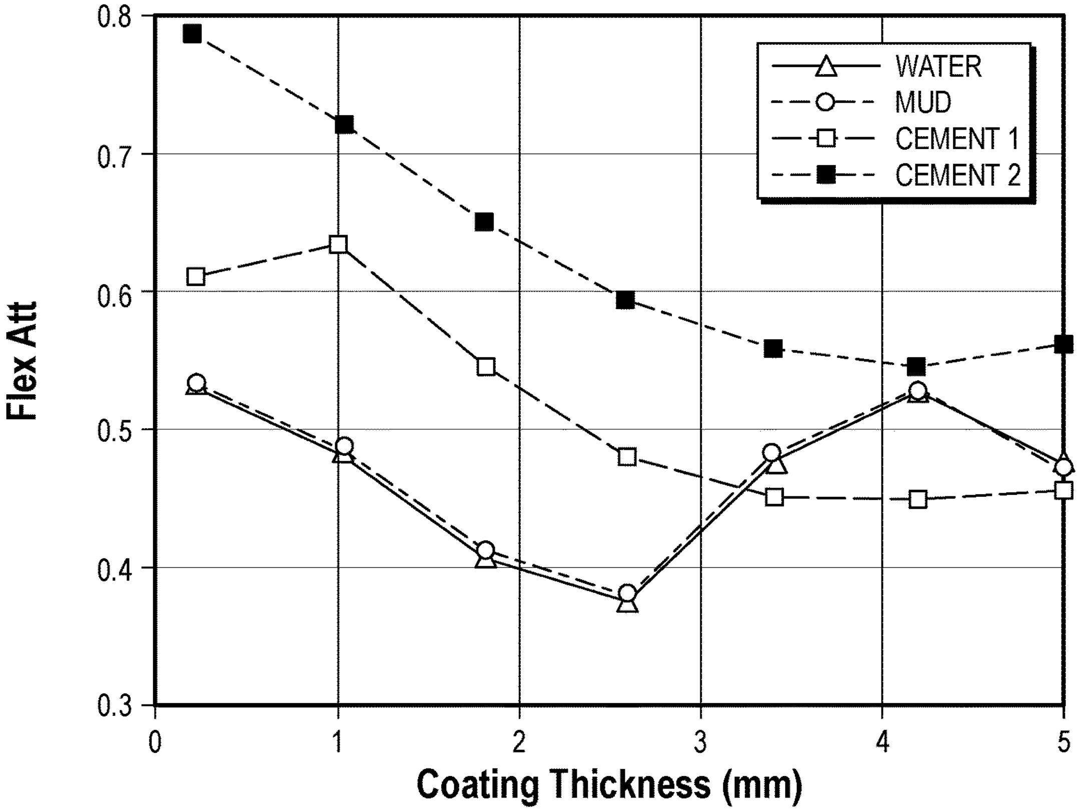
FIG. 10 shows the impact of the coating thickness on the flexural attenuation for an epoxy coating using the pitch-catch technique according to an embodiment of the present disclosure.

FIG. 10 shows the impact of the coating thickness on the flexural attenuation for an epoxy coating. Ultrasonic waveform data can also be gathered using the pitch-catch technique performed using the transducers in a pitch-catch arrangement. The ultrasonic waveform data collected by the pitch-catch arrangement includes leaky-Lamb wave measurements which can be decomposed in extensional mode and flexural mode components. The flexural mode or zero-order antisymmetric mode ($A_0$) and symmetric mode ($S_0$) are highly dispersive. Further, the flexural mode is sensitive to the interface between casing and coating, and between coating and cement. To obtain a flexural attenuation measurement, an ultrasonic acoustic downhole tool emits pulses in the range of a few hundred kilohertz, for example. The material inside the annulus behind the casing is evaluated by sending a short pressure pulse toward the casing wall that excites the elastic waves inside the casing. The propagation of these waves is strongly affected by casing-coating bond quality, coating-material bond quality, and the material in the annulus. An acoustic beam at oblique incidence onto the casing excites modes of the family of Lamb waves, which are predominantly the zeroth-order antisymmetric (flexural) and symmetric (extensional) modes. Based on the zeroth-order antisymmetric (flexural) mode response, such as the flexural attenuation, the quality of the material in the annulus may be estimated. These wave modes are collected using the pitch-catch source and receiver combinations oriented appropriately and governed by dispersion equations detailed below.

$$\frac{\tan\beta\frac{d}{2}}{\tan\alpha\frac{d}{2}} = -\left[\frac{4\alpha\beta k^2}{(k^2-\beta^2)}\right]^{+/-1} \quad \text{equation (1)}$$

where $$\alpha 2 = \frac{\omega^2}{V_P^2} - k^2$$

and $$\beta 2 = \frac{\omega^2}{V_S^2} - k^2$$

wherein the (+) sign on the exponent represents the symmetric type of lamb wave propagation and the (−) sign on the exponent represents the anti-symmetric type of lamb wave propagation, ω is the circular frequency, d is thickness of plate or casing, k is wave number and $V_p$ and $V_s$ are the longitudinal and shear wave velocities in the plate or casing.

The distance between the transmitter and the receiver may be from about 0.1 inch (0.254 cm) to about 5 feet (152.4 cm), or from about 0.5 inch (1.27 cm) to about 3.5 feet (106.7 cm), or from about 1 inch (2.54 cm) to about 30 inches (76.2 cm), or from about 4 inches (10.16 cm) to 27.5 inches (69.85 cm), or from about 6 inches (15.24 cm) to 25 inches (63.5 cm), or from about 8.5 inches (21.6 cm) to 20 inches (50.8 cm) and from about 10 inches (25.4 cm) to 15 inches (38.1 cm) according to embodiments of the present disclosure. The reflection of the acoustic waves, the echo, may be measured by the transceiver for evaluation of the material in the annulus. Flexural attenuation is one of the cement evaluation measurements as flexural attenuation is a function of acoustic impedance on both sides of casing, and therefore depends on the properties of the material in the annulus on the other side of the casing and is sensitive to the interface between the casing and the coating, and the interface between the coating and the material in the annulus.

FIG. 10 illustrates the impact of the thickness of an epoxy coating on a casing on the evaluation of a material in the annulus, wherein the material in the annulus may be water, mud, cement 1, or cement 2, and wherein the impedance for water is 1.5 MRayls, 1.74 MRayls for mud, 3.5 MRayls for cement 1, and 6 MRayls for cement 2. The flexural attenuation decreases for cement 2 as the epoxy coating thickness increases from 0.25 mm to 4.25 mm. The flexural attenuation decreases with water or mud in the annulus as the epoxy coating thickness increases from 0.25 mm to 2.75 mm. However, the flexural attenuation increases after that for water or mud in the annulus until reaching a maximum at a thickness of 4.25 mm and decreases after that. Finally, the flexural attenuation decreases for cement 1 from an epoxy coating thickness of 1.1 mm until 3.5 mm. It plateaus after that. From the plot, it is evident that a particular flexural attenuation value may thus be because of annular material or because of the impact of coating thickness. Thus, interpreting a flexural attenuation map may become ambiguous.

Figure 11:
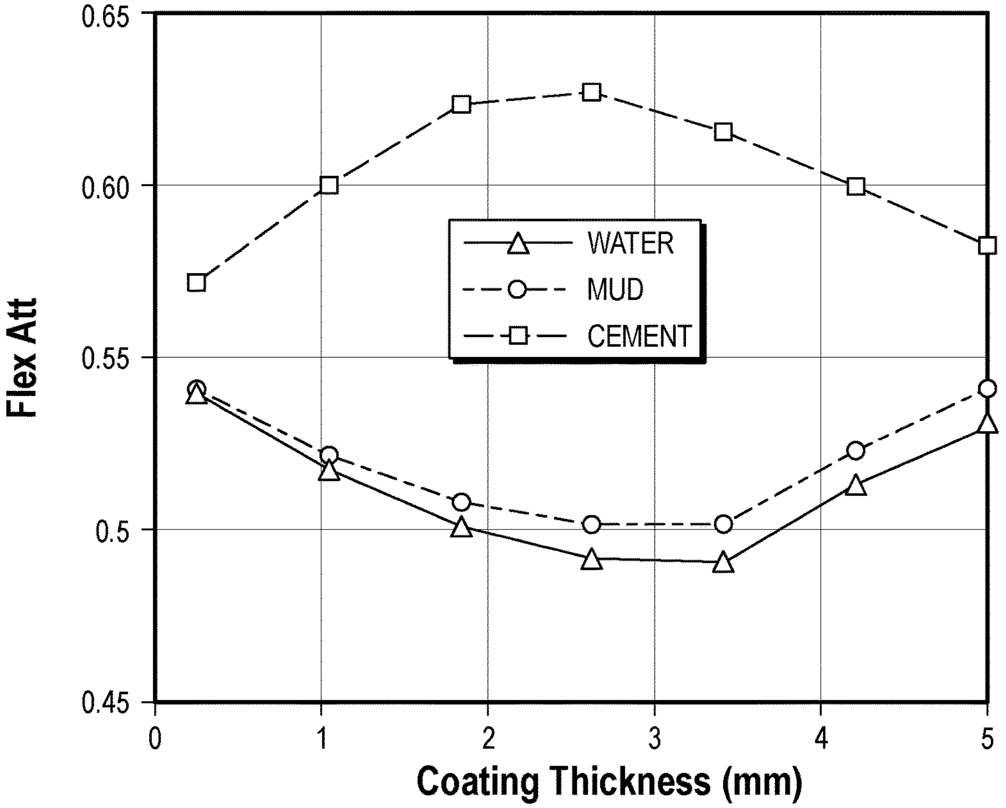
FIG. 11 shows the impact of the coating thickness on the flexural attenuation for a Flint coating using the pitch-catch technique according to an embodiment of the present disclosure.

FIG. 11 shows the impact of the coating thickness on the flexural attenuation for a Flint coating using the pitch-catch technique according to an embodiment of the present disclosure. The flexural attenuation shows a different behavior with a Flint coating with cement 1 in the annulus versus water or mud in the annulus as illustrated in FIG. 11. The flexural attenuation decreases from a Flint coating thickness of 0.25 mm to 3 mm and then increases after a Flint coating thickness of 3.5 mm with water in the annulus or with mud in the annulus. In contrast, the flexural attenuation increases with an increase in Flint coating thickness from 0.25 mm to 2.75 mm and then the flexural attenuation decreases after a Flint coating thickness of 2.75 mm with cement 1 in the annulus. It may, however, still be possible to distinguish between fluids such as water or mud in the annulus versus cement in the annulus when the coating is a Flint coating without ambiguity.

Figure 12A:
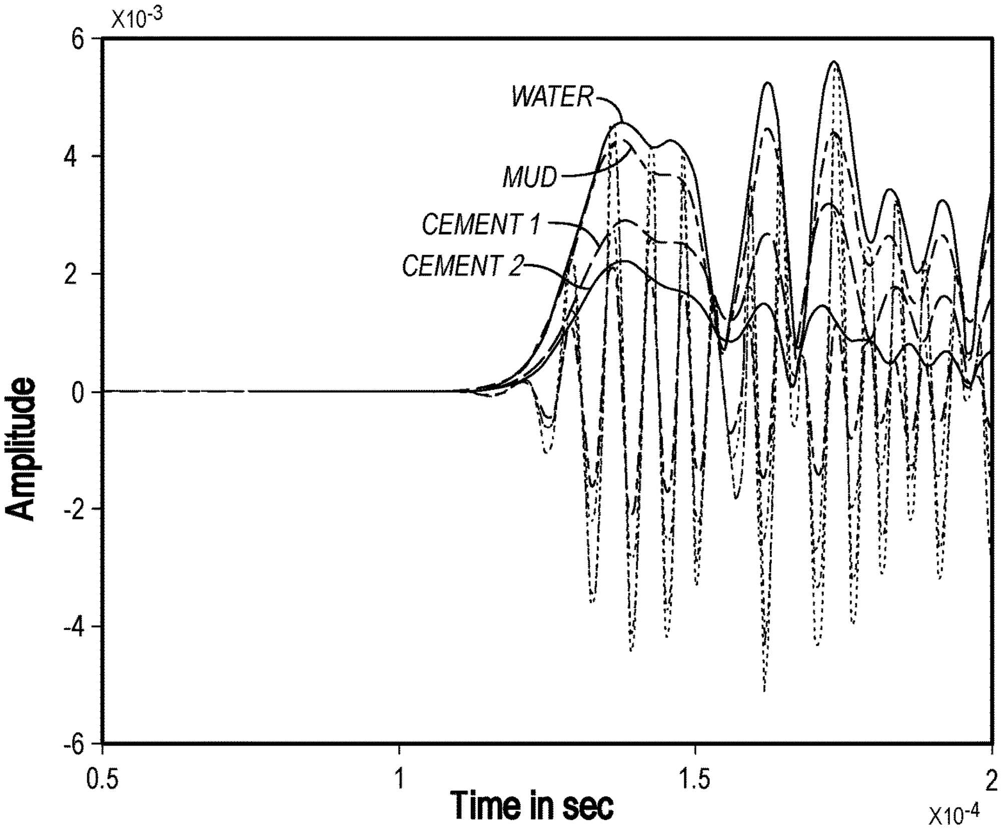
FIG. 12A shows the amplitude as a function of time with different material in the annulus using the pitch-catch technique according to an embodiment of the present disclosure.
Figure 12B:
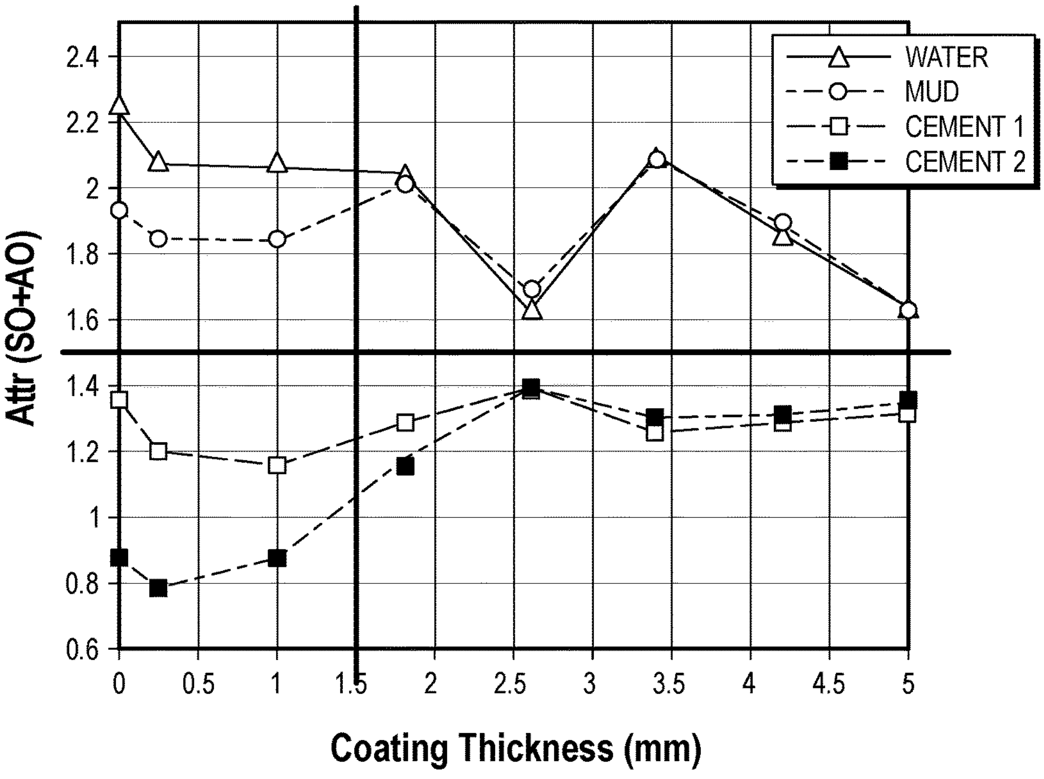
FIG. 12B shows the impact of the coating thickness on the attribute for an epoxy coating using the pitch-catch technique according to an embodiment of the present disclosure.
Figure 12C:
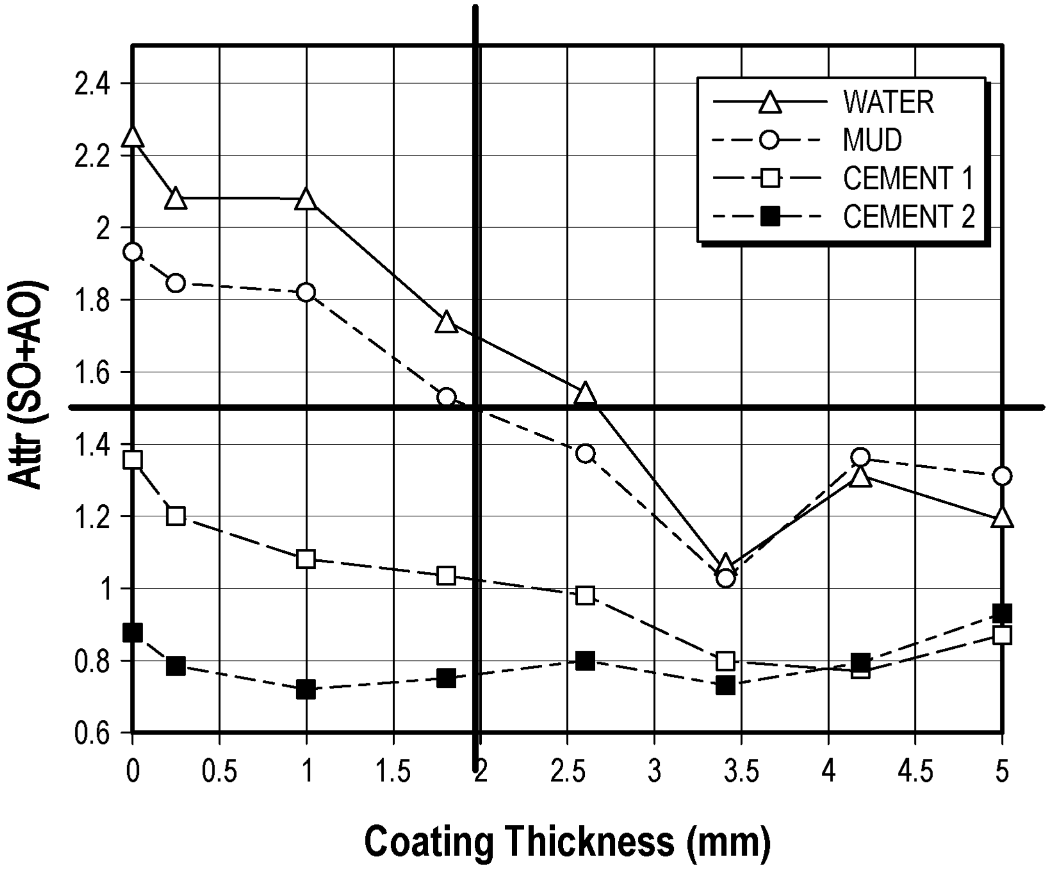
FIG. 12C shows the impact of the coating thickness on the attribute for a Flint coating using the pitch-catch technique according to an embodiment of the present disclosure.

A correlation between an attribute and the impedance of the annulus with coating thickness from 0.01 mm to 1.5 mm was found reliable as illustrated by FIGS. 12A-C.

FIG. 12A shows the amplitude as a function of time with different material in the annulus using the pitch-catch technique according to an embodiment of the present disclosure.

FIG. 12B shows the impact of the coating thickness on the attribute for an epoxy coating with water, mud, cement 1, or cement 2 in the annulus using the pitch-catch technique according to embodiments of the present disclosure. Water may be any type of water such as tap water, any type of brine with any concentration of salt, or any type of produced water with any concentration of salt. Mud may be any type of mud including water-based mud or oil-based mud. Cement 1 may be any type of cement including low density Portland cement or foam cement. However, cement 1 differs from cement 2. Cement 2 may be a heavier cement with a higher acoustic impedance than cement 1. The distance between the transmitter and the receiver is 15 inches (38.1 cm) for this data. Further, the casing is a 9.625-inch (24.45 cm) casing and water (without any salt added) is used as logging fluid.

FIG. 12 B shows the synthetic waveforms for the proposed mixed ($S_0$+$A_0$) measurements and the attribute under different coating thickness for an epoxy coating. The attribute of the symmetric mode ($S_0$) and antisymmetric mode ($A_0$) can be defined as the integral of the ($A_0$+$S_0$) waveform envelop measurement, for example. The attribute can be anything that stands as a proxy for the energy of the wave modes in the recorded waveforms. Using the attribute of the symmetric mode ($S_0$) and antisymmetric mode ($A_0$) from a pitch-catch configuration with optimized transducer angle and firing frequency to excite the symmetric mode ($S_0$) and antisymmetric mode ($A_0$) in the casing, reliable trends were found for epoxy coating. Further, the measurement is sensitive enough to distinguish mud from light cement, which is a known challenge with conventional ultrasonic measurements (using $S_1$). $A_0$+$S_0$ waveforms are collected using transmitters and receivers that are at an angle intermediate between the P wave critical angle and S wave critical angle for the first interface as defined earlier. Once the waveforms are obtained, an attribute from the waveform can be computed. The angle and firing frequency will depend upon the logging fluid and the casing thickness. The dispersion curves (computed from the dispersion equation given above) will govern the optimum parameters. For example, when water is used as logging fluid, the angle may be between about 30 degrees and about 40 degrees, between about 31 degrees and about 38 degrees, between about 32 degrees and about 35 degrees, or about 33 degrees. For a casing thickness of 0.5 inch, the firing frequencies may be centered around 200 kHz, for example.

FIG. 12C shows the impact of the coating thickness on the attribute for a Flint coating with water, mud, cement 1, or cement 2 in the annulus using the pitch-catch technique according to embodiments of the present disclosure. Water may be any type of water such as tap water, any type of brine with any concentration of salt, or any type of produced water with any concentration of salt. Mud may be any type of mud including water-based mud or oil-based mud. Cement 1 may be any type of cement including low density Portland cement or foam cement. However, cement 1 differs from cement 2. Cement 2 may be a heavier cement with a higher acoustic impedance than cement 1. The distance between the transmitter and the receiver is 15 inches (38.1 cm) for this data. Further, the casing is a 9.625-inch (24.45 cm) casing and water (without any salt added) is used as logging fluid.

FIG. 12 C shows the synthetic waveforms for the proposed mixed ($S_0$+$A_0$) measurements and the attribute under different coating thickness for a Flint coating. The attribute of the symmetric mode ($S_0$) and antisymmetric mode ($A_0$) can be defined as the integral of the ($A_0$+$S_0$) waveform envelop measurement, for example. The attribute can be anything that stands as a proxy for the energy of the wave modes in the recorded waveforms. Using the attribute of the symmetric mode ($S_0$) and antisymmetric mode ($A_0$) from a pitch-catch configuration with optimized transducer angle and firing frequency to excite the symmetric mode ($S_0$) and antisymmetric mode ($A_0$) in the casing, reliable trends were found for Fling coating as illustrated in FIG. 12C. Further, the measurement is sensitive enough to distinguish mud from light cement, which is a known challenge with conventional ultrasonic measurements (using $S_1$). $A_0$+$S_0$ waveforms are collected using transmitters and receivers that are at an angle intermediate between the P wave critical angle and S wave critical angle for the first interface as defined earlier. Once the waveforms are obtained, an attribute from the waveform can be computed. The angle and firing frequency will depend upon the logging fluid and the casing thickness. The dispersion curves (computed from the dispersion equation given above) will govern the optimum parameters. For example, when water is used as logging fluid, the angle may be between about 30 degrees and about 40 degrees, between about 31 degrees and about 38 degrees, between about 32 degrees and about 35 degrees, or about 33 degrees. For a casing thickness of 0.5 inch, the firing frequencies may be centered around 200 kHz, for example.

In the example attribute plotted in FIG. 12B and FIG. 12C, the attribute is computed as the sum of waveform envelope amplitudes between $1.2\times10^{-4}$ and $1.8\times10^{-4}$ seconds. The time window defined here may vary depending on the arrival and ending times of the $S_0$+$A_0$ modes in the waveform. The time window depends on the position of transducers with respect to the first interface, the speed of sound in the logging mud, the distance between source and receivers, and the frequency content of the wave modes. As can be observed from FIGS. 12 B-C with varying epoxy and Flint coating thicknesses for different materials in annulus, the attributes exhibit separation up to at least 1.5 mm. The attributes exhibit separation even up to 3 mm with Flint coating as illustrated in FIG. 12 (*c*). Typically, coating thicknesses are 2 mm or under. Hence, a log or map of the attribute will unambiguously help distinguish between fluids and solids in the annulus. This provides an interpretation advantage over pulse echo based annular impedance estimate maps and flexural attenuation maps, especially when the coating is epoxy based.

In some embodiments, the methods according to embodiments of the present disclosure can determine if the coated casing string is fully bonded to a cement or is free pipe or is partially bonded to a formation with a coating thickness up to 1 mm, up to 1.5 mm, up to 2 mm, up to 2.5 mm, up to 3 mm, up to 4 mm and above. Further, the methods according to embodiments of the present disclosure can determine the type of material behind the coated casing in the annulus of the wellbore with a coating thickness up to 1 mm, up to 1.5 mm, up to 2 mm, up to 2.5 mm, up to 3 mm, up to 4 mm and above. The methods according to some embodiments of the present disclosure can distinguish the type of material including between air, water, mud, cement, and between different types of cements with a coating thickness up to 1 mm, up to 1.5 mm, up to 2 mm, up to 2.5 mm, up to 3 mm, up to 4 mm and above.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. The systems and methods may comprise any of the various features disclosed herein, comprising one or more of the following statements.

Statement 1. A method comprising: disposing an acoustic logging tool inside a coated casing string, wherein the coated casing string is disposed in a wellbore to form an annulus between the coated casing string and the wellbore, and is at least in part bonded to the wellbore by a cement; transmitting an acoustic signal into at least part of the coated casing string; measuring an attribute of a Lamb wave mode of the acoustic signal; and determining if the coated casing string is fully or partially bonded to a cement or is free pipe or is partially bonded to a formation.

Statement 2. The method of statement 1, wherein the attribute of the Lamb wave mode is an attribute of at least one of a symmetric mode ($S_0$) and an antisymmetric mode ($A_0$) of a flexural wave.

Statement 3. The method of statement 1 or statement 2, wherein the attribute of the Lamb wave mode is an attribute of a symmetric mode ($S_0$) of a flexural wave.

Statement 4. The method of any one of statements 1-3, wherein the attribute of the Lamb wave mode is an attribute of a symmetric mode ($S_0$) and antisymmetric mode ($A_0$) of a flexural wave.

Statement 5. The method of any one of statements 1-4, wherein the attribute of the Lamb wave mode is an integral of a symmetric mode (So) and an antisymmetric mode (Ao), ($A_0$+$S_0$), waveform amplitude measurement.

Statement 6. The method of any one of statements 1-5, further using the acoustic logging tool using transducers in a pitch-catch arrangement.

Statement 7. The method of any one of statements 1-6, wherein the acoustic logging tool comprises at least one transmitter and at least one receiver separated by an axial distance ranging from about 0.1 inch (0.254 cm) to about 5 feet (152.4 cm).

Statement 8. A method of identifying a material behind a coated casing string in an annulus of a wellbore comprising: disposing an acoustic logging tool inside the coated casing string in the wellbore; transmitting an acoustic signal into at least part of the coated casing string; measuring an attribute of a Lamb wave mode of the acoustic signal; and determining a type of material behind the coated casing in the annulus of the wellbore.

Statement 9. The method of statement 8, further distinguishing the type of material between air, water, mud, and cement.

Statement 10. The method of statement 8 or statement 9, further correlating the attribute to an impedance of the material behind the coated casing in the annulus of the wellbore.

Statement 11. The method of any one of statements 8-10, wherein the attribute of the Lamb wave mode is an attribute of at least one of a symmetric mode ($S_0$) and an antisymmetric mode ($A_0$) of a flexural wave.

Statement 12. The method of any one of statements 8-11, wherein the attribute of the Lamb wave mode is an attribute of a symmetric mode ($S_0$) of a flexural wave.

Statement 13. The method of any one of statements 8-12, wherein the attribute of the Lamb wave mode is an attribute of a symmetric mode ($S_0$) and antisymmetric mode ($A_0$) of a flexural wave.

Statement 14. The method of any one of statements 8-13, wherein the attribute of the Lamb wave mode is an integral of a symmetric mode ($S_0$) and an antisymmetric mode ($A_0$), ($A_0$+$S_0$), waveform amplitude measurement.

Statement 15. The method of any one of statements 8-14, wherein the attribute of the Lamb wave mode is a proxy for energy of the mode.

Statement 16. The method of any one of statements 8-15, wherein the acoustic logging tool comprises at least one transmitter and at least one receiver separated by an axial distance ranging from about 0.1 inch (0.254 cm) to about 5 feet (152.4 cm).

Statement 17. The method of any one of statements 8-16, further differentiating different types of cement if present behind the coated casing in the annulus of the wellbore.

Statement 18. The method of any one of statements 8-17, further using the acoustic logging tool using transducers in a pitch-catch arrangement.

Statement 19. The method of any one of statements 8-18, wherein the pitch-catch arrangement includes leaky-Lamb wave measurements.

Statement 20. The method of any one of statements 8-19, further collecting Lamb wave modes using a pitch-catch source and receiver combinations governed by dispersion equations detailed below.

$$\frac{\tan\beta\frac{d}{2}}{\tan\alpha\frac{d}{2}} = -\left[\frac{4\alpha\beta k^2}{(k^2-\beta^2)}\right]^{+/-1} \quad \text{equation (1)}$$

where $$\alpha 2 = \frac{\omega^2}{V_P^2} - k^2$$

and $$\beta = \frac{\omega^2}{V_S^2} - k^2$$

wherein the (+) sign on the exponent represents the symmetric type of lamb wave propagation and the (−) sign on the exponent represents the anti-symmetric type of lamb wave propagation, ω is the circular frequency, d is thickness of plate or casing, k is wave number and $V_p$ and $V_s$ are longitudinal and shear wave velocities in the casing.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below.

Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:

disposing an acoustic logging tool inside a coated casing string, wherein the coated casing string is disposed in a wellbore to form an annulus between the coated casing string and the wellbore, and is at least in part bonded to the wellbore by a cement;

transmitting an acoustic signal into at least part of the coated casing string to form a Lamb wave mode;

measuring an attribute of a Lamb wave mode, wherein the attribute of the Lamb wave mode is an integral of a symmetric mode (So) and an antisymmetric mode (Ao), ($A_0$+$S_0$), waveform amplitude measurement; and determining if the coated casing string is fully or partially bonded to the cement or is free pipe or is partially bonded to a formation based at least in part on the Lamb wave mode.

2. The method of claim 1, wherein the attribute of the Lamb wave mode is an attribute of at least one of a symmetric mode ($S_0$) and an antisymmetric mode ($A_0$) of a flexural wave.

3. The method of claim 1, wherein the attribute of the Lamb wave mode is an attribute of a symmetric mode ($S_0$) of a flexural wave.

4. The method of claim 1, wherein the attribute of the Lamb wave mode is an attribute of a symmetric mode ($S_0$) and antisymmetric mode ($A_0$) of a flexural wave.

5. The method of claim 1, further comprising using the acoustic logging tool using transducers in a pitch-catch arrangement.

6. The method of claim 1, wherein the acoustic logging tool comprises at least one transmitter and at least one receiver separated by an axial distance ranging from about 0.1 inch (0.254 cm) to about 5 feet (152.4 cm).

7. The method of claim 1, wherein the acoustic logging tool comprises at least one transmitter and at least one receiver separated by an axial distance ranging from about 0.1 inch (0.254 cm) to about 1 foot (30.5 cm).

8. A method of identifying a material behind a coated casing string in an annulus of a wellbore comprising:

disposing an acoustic logging tool inside the coated casing string in the wellbore;

transmitting an acoustic signal into at least part of the coated casing string;

measuring an attribute of a Lamb wave mode of the acoustic signal, wherein the attribute of the Lamb wave mode is an integral of a symmetric mode (So) and an antisymmetric mode (Ao), ($A_0$+$S_0$), waveform amplitude measurement; and determining a type of material behind the coated casing in the annulus of the wellbore.

9. The method of claim 8, further comprising distinguishing the type of material between air, water, mud, and cement.

10. The method of claim 8, further comprising correlating the attribute to an impedance of the material behind the coated casing in the annulus of the wellbore.

11. The method of claim 8, wherein the attribute of the Lamb wave mode is an attribute of at least one of a symmetric mode ($S_0$) and an antisymmetric mode ($A_0$) of a flexural wave.

12. The method of claim 8, wherein the attribute of the Lamb wave mode is an attribute of a symmetric mode ($S_0$) of a flexural wave.

13. The method of claim 8, wherein the attribute of the Lamb wave mode is an attribute of a symmetric mode ($S_0$) and antisymmetric mode ($A_0$) of a flexural wave.

14. The method of claim 8, wherein the attribute of the Lamb wave mode is a proxy for energy of the mode.

15. The method of claim 8, wherein the acoustic logging tool comprises at least one transmitter and at least one receiver separated by an axial distance ranging from about 0.1 inch (0.254 cm) to about 5 feet (152.4 cm).

16. The method of claim 8, further comprising differentiating different types of cement if present behind the coated casing in the annulus of the wellbore.

17. The method of claim 8, further comprising using the acoustic logging tool using transducers in a pitch-catch arrangement.

18. The method of claim 17, wherein the pitch-catch arrangement includes leaky-Lamb wave measurements.

19. The method of claim 8, further comprising collecting Lamb wave modes using a pitch-catch source and receiver combinations governed by dispersion equations detailed below $$\frac{\tan\beta\frac{d}{2}}{\tan\alpha\frac{d}{2}} = -\left[\frac{4\alpha\beta k^2}{(k^2-\beta^2)}\right]^{+/-1} \qquad \text{equation (1)}$$

where $$\alpha 2 = \frac{\omega^2}{V_P^2} - k^2$$

and $$\beta = \frac{\omega^2}{V_S^2} - k^2$$

wherein a (+) sign on an exponent represents a symmetric type of lamb wave propagation and a (−) sign on the exponent represents an anti-symmetric type of lamb wave propagation, ω is a circular frequency, d is a thickness of plate or casing, k is a wave number, and $V_p$ and $V_s$ are longitudinal and shear wave velocities in the casing.

20. The method of claim 8, wherein the acoustic logging tool comprises at least one transmitter and at least one receiver separated by an axial distance ranging from about 0.1 inch (0.254 cm) to about 1 foot (30.5 cm).

* * * * *